United States Patent

[11] 3,574,418

| [72] | Inventor | Nobuya Okabe<br>Tokyo, Japan |
|---|---|---|
| [21] | Appl. No. | 797,638 |
| [22] | Filed | Feb. 7, 1969 |
| [45] | Patented | Apr. 13, 1971 |
| [73] | Assignee | Hitachi, Ltd.<br>Tokyo-To, Japan |
| [32] | Priority | Feb. 7, 1968 |
| [33] | | Japan |
| [31] | | 43/7162 |

[54] SHOCK ABSORBER FOR ENDLESS-TRACK-TYPE TRACTORS AND THE LIKE
10 Claims, 3 Drawing Figs.

[52] U.S. Cl. ............................................ 305/10,
74/242.14, 267/34
[51] Int. Cl. ........................................... B62d 55/30
[50] Field of Search ................................... 305/10;
267/34; 74/242.14

[56] References Cited
UNITED STATES PATENTS

| 2,561,901 | 7/1951 | Bachman | 305/10 |
| 2,618,478 | 11/1952 | Conway | 267/34X |
| 2,818,311 | 12/1957 | Ashley | 305/10 |
| 3,098,397 | 7/1963 | Schaefer | 305/10 |
| 3,101,977 | 8/1963 | Hyler | 91/433X |
| 3,409,335 | 11/1968 | Peipho | 305/10 |

*Primary Examiner*—Richard J. Johnson
*Attorney*—Craig, Antonelli, Stewart & Hill ABSTRACT: A shock absorber for the endless track of a vehicle providing three oil cylinders, namely, an actuating cylinder responsive to shock motion, a shock-absorbing cylinder and a tension-adjusting cylinder and means for controlling the flow of fluid to these cylinders so that when any shock motion is applied to the actuating cylinder, the oil within the oil-filled chamber of the cylinder is forced to flow into the shock-absorbing cylinder, whereby the shock motion can be absorbed; whereas, if the endless track becomes loose, the oil within the oil-filled chamber of the tension-adjusting cylinder is forced to flow into the oil-filled chamber of the actuating cylinder, whereby the tension of the endless track belt can be recovered.

PATENTED APR 13 1971 3,574,418

INVENTOR
NOBUYA OKABE

BY Craig, Antonelli, Stewart & Hill
ATTORNEYS

SHOCK ABSORBER FOR ENDLESS-TRACK-TYPE TRACTORS AND THE LIKE

This invention relates to a shock absorber for endless-track-type tractors and the like, and more particularly to the same including means for keeping the tension on an endless track belt at a constant value.

In the conventional endless-track-type tractors, a pair of endless track belts are utilized, each of which is tensioned through a suitable shock absorber. Thus, such shock absorber is required to not only effectively absorb the shock applied to the endless track belt but to keep the tension of the belt at a constant value, even if the belt is wearing with time.

Accordingly, one object of the present invention is to provide an improved shock absorber wherein the tension on the endless track belt can be automatically kept at a desired value.

Another object of the present invention is to provide an improved shock absorber wherein the tension to be provided on the endless track belt can be adjusted without disadvantageously influencing the shock-absorption function thereof.

These, as well as additional objects and advantages of the present invention will become more apparent from the following description beginning with a brief explanation of a conventional shock absorber, when taken in connection with the accompanying drawing, wherein.

Figure 1:
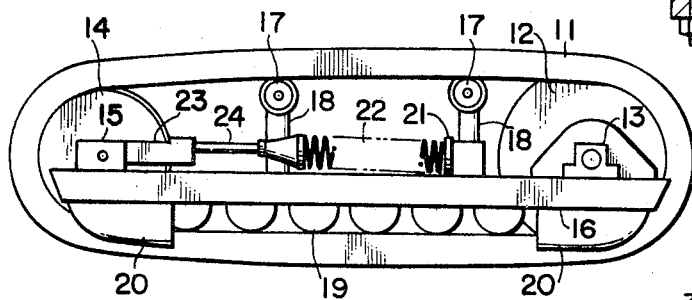
FIG. 1 is a side view showing the endless track portion of a conventional tractor.

Referring now to FIG. 1 showing a conventional tractor: numeral 11 shows an endless track belt engaged by a sprocket wheel 12 mounted on a bearing 13 for driving the track belt and a front idler 14 for the track belt 11 mounted on a bearing 15. The bearings 13 and 15 are mounted on a truck 16 and carrier rollers 17 provided for carrying the track belt are carried by supporting members 18 fixed on the frame 16. A series of bottom rollers 19 are supported by the frame 16 and flanges 20 fixed to the frame 16 are provided for preventing the track belt 11 from slipping out.

The front bearing 15 is mounted on the frame 16 so as to slide in the longitudinal direction of the tractor. A spring-supporting plate 21 is fixed to the frame 16 as shown in the FIG., and a compressed spring member 22 is inserted between a yoke member 23 of the slideable bearing 15 and the spring-supporting plate 21. Between the yoke 23 and the spring 22, a pushrod 24 is inserted, by which both members are connected with each other. The spring member 22 serves to absorb shock motion applied to the track belt 11 during the operation of the tractor. Though FIG. 1 illustrates only one side of the tractor, the same structural arrangement is also provided on the opposite side thereof.

Since the inner and outer surfaces of the track belt 11 wear with time, the effective length of the belt 11 will gradually lengthen. When the abrasion of the track belt exceeds a permitted limit determined from the performance of the spring member 22, the belt becomes loose, and then tends to slip out from the bottom rollers 19. Moreover, the loose condition of the track belt 11 promotes abnormal abrasion of the belt. Accordingly, it is necessary to adjust the tension value given to the belt 11. For this purpose, it has been heretofore the practice to adjust the tension of the belt by means of an adjusting screw or grease pressure. However, this method is not efficient in spite of a great deal of trouble.

Figure 2:
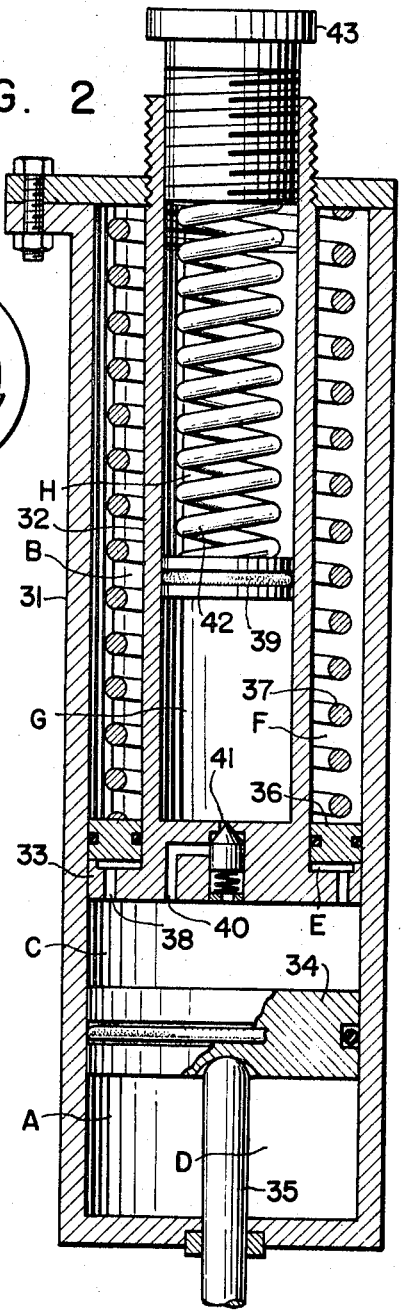
FIG. 2 is a sectional view showing one embodiment of a shock absorber in accordance with the present invention.

According to the present invention, it becomes possible to eliminate the above-mentioned disadvantages by replacing the spring member 22 with a shock absorber of special configuration. Referring to FIG. 2 illustrating one embodiment of the present invention, numeral 31 identifies an outer cylinder which is to be fixed to the truck frame 16 of FIG. 1, and 32 identifies an inner cylinder which is coaxially located in and fixed to the outer cylinder 31. The inserted end portion of the inner cylinder 32 forms a partition plate 33 which divides the outer cylinder 31 into two cylinder spaces or chambers A and B. A shock-receiving piston 34 is located in the chamber A of the outer cylinder 31, thereby to divide the chamber A into an oil-filled chamber C and a vacant chamber D. A piston rod 35 is inserted into the vacant chamber D through the end wall of the outer cylinder 31. The inside end of the piston rod 35 contacts with the piston 34, and the outside end thereof is connected with the pushrod 24 (FIG. 1). A ring piston 36 is located in the chamber B of the outer cylinder 31 so as to be slideable along the outer surface of the inner cylinder 32 in the longitudinal direction thereof. The ring piston 36 divides the chamber B into an oil-filled chamber E and a vacant chamber F. A shock-absorbing spring 37 is arranged within the vacant chamber F between the ring piston 36 and the outer end wall of the outer cylinder 31. Oil passages 38 connecting the oil-filled chambers C and E are opened through the partition plate 33 of the inner cylinder 32. An inner piston 39 is located within the inner cylinder 32, thereby to divide the cylinder into an oil-filled chamber G and a vacant chamber H. A second oil passage 40 connecting the oil-filled chambers C and G is opened through the partition plate 33 of the inner cylinder 32. Indicated with numeral 41 is a nonreturn valve arranged at the midway of the passage 40 within the partition plate 33, which permits only that oil flow directed from the chamber G to the chamber C. A coil spring 42 is inserted within the vacant chamber H between the piston 39 and a cap member 43 screwed into the end portion of the inner cylinder 32.

The effective strength of the inner spring 42 is selected smaller than that of the shock-absorbing spring 37, so that the pressurized oil filling the chamber G does not flow into the chamber C through the passage 40 and into the chamber E through the passage 38 against the force of the shock-absorbing spring 37. On the other hand, the pressurized oil within the chamber E is forced to flow into the chamber C by means of the ring piston 36. Thus, the ring piston 36 is positioned at the bottom end of the cylinder chamber B under ordinary conditions. The tension to be given to the endless track belt through the piston rod 35 is manually adjusted by means of the cap member 43.

In the case wherein any shock motion is applied to the endless track belt, during the operation of the tractor, such shock motion is transmitted through the actuating piston rod 35 to the piston 34. Consequently, the piston 34 suddenly moves upward so that the oil within the oil chamber C flows into the oil chamber E through the passage 38 against the shock-absorbing spring 37. Thus the ring piston 36 within the cylinder chamber B is forced to move upward against the spring 37, whereby the shock motion applied to the endless track belt can be effectively absorbed. At this moment, oil flow directed from the oil chamber C to the oil chamber G is prohibited by means of the nonreturn valve 41.

If the endless track belt is wearing with time, it becomes loose. In such case, the inner spring 42 serves to push the piston 39 toward the partition plate 33, and thereby to partially introduce the oil within the chamber G of the cylinder 32 into the oil chamber C of the cylinder A through the passage 40. Consequently, the piston 34 serves to move the piston rod 35, whereby a desired tension is automatically given to the track belt.

Figure 3:
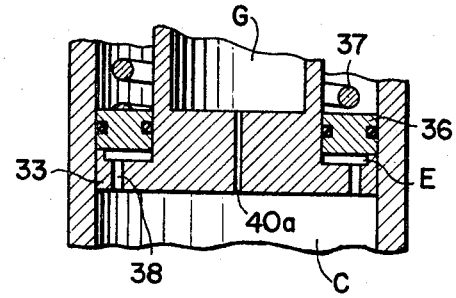
FIG. 3 is a partial sectional view showing one modification of the embodiment of FIG. 2.

FIG. 3 illustrates one modification of the embodiment of FIG. 2, wherein a narrow passage 40a is substituted for the nonreturn valve 40 in FIG. 2. This passage is sufficiently narrow to substantially prohibit oil-flow directing from the chamber C to the chamber G at the time when the oil within the chamber C is suddenly or abruptly pressured. Consequently, the shock applied to the track belt can be absorbed by the shock-absorbing spring 37, as mentioned above in reference to FIG. 2. On the other hand, since the abrasion of the track belt tends to gradually progress, the adjustment of the tension to be given to the belt can be carried out slowly by the introducing of oil from the chamber G into the chamber C through the narrow passage 40a.

According to the present invention, it becomes possible to automatically adjust the tension of the track belt at a constant value and to automatically prevent the looseness of the belt originating from the abrasion thereof. Moreover, it is also possible to adjust the tension value of the track belt in accordance with the operating condition of the tractor, by controlling the strength of the inner spring 42 by means of the screwcap member 43.

While I have shown and described only one embodiment of the present invention and one modification thereof, it will be understood that the invention is not limited thereto but is susceptible of numerous changes and modifications as known to a person skilled in the art, and I therefore do not wish to be limited to the details shown and described herein but intend to cover such modifications and changes as are within the ability of the ordinary worker in the art.

I claim:

1. A shock absorber for endless-track-type tractors and the like including means for keeping the tension of an endless track belt at a constant value, which comprises:
    a first oil cylinder including a first piston, a piston rod, and a first oil-filled chamber formed on one side of said first piston;
    a second oil cylinder for shock absorption including a second piston, a second oil-filled chamber formed on one side of said second piston, and a shock-absorbing spring arranged within the cylinder between said second piston and the wall thereof so as to apply pressure to the oil within the second oil-filled chamber by way of the second piston;
    a third oil cylinder for tension adjustment including a third piston, a third oil-filled chamber formed on one side of said third piston, and a tension-adjusting spring arranged within the cylinder between said third piston and the wall thereof so as to apply pressure to the oil within the third oil-filled chamber by way of the third piston;
    a first oil-passage means connecting the oil-filled chambers of said first and second cylinders;
    a second oil-passage means connecting the oil-filled chamber of said first and third cylinders;
    means for prohibiting oil-flow from the first oil-filled chamber to the third oil-filled chamber in response to shock pressures applied to the first oil-filled chamber by way of the first piston; and
    means for manually adjusting the strength of said tension-adjusting spring.

2. A shock absorber according to claim 1, wherein said prohibiting means comprises a nonreturn valve.

3. A shock absorber according to claim 1, wherein said prohibiting means comprises a sufficiently narrow passage to effectively prevent fluid flow therethrough in response to transient pressures.

4. A shock absorber according to claim 1, wherein the effective strength of the shock-absorbing spring within said second cylinder is selected to be larger than that of the tension-adjusting spring within said third cylinder.

5. A shock absorber according to claim 1, wherein said adjusting means comprises a cap screwed into the outer end portion of said inner cylinder member to receive said tension-adjusting spring.

6. A shock absorber for endless-track-type tractors and the like including means for keeping the tension of an endless track belt at a constant value, which comprises:
    an outer cylinder member;
    an inner cylinder member coaxially fixed within said outer cylinder member with one end terminating within said outer cylinder;
    a partition member formed at said one end portion of said inner cylinder and extending to the inner wall of said outer cylinder to divide the outer cylinder member into first and second cylinder chambers;
    a first piston located within said first cylinder chamber;
    a piston rod for actuating said first piston;
    a second piston having a ringlike shape located within said second cylinder chamber so as to slide on the outer surface of said inner cylinder member;
    a shock-absorbing spring located within said second cylinder chamber so as to push said second piston toward said partition member;
    a third piston located within said inner cylinder member;
    a tension-adjusting spring located within the inner cylinder member so as to push said third piston toward said partition member;
    first oil-passage means formed through said partition member to connect both of said first and second cylinder chambers;
    second oil-passage means formed through said partition member to connect both said first cylinder chamber and said inner cylinder member;
    means for prohibiting the oil-flow from said first cylinder chamber to said inner cylinder member when the former oil-filled chamber is suddenly pressured by said first piston; and
    means for manually adjusting the strength of said tension-adjusting spring.

7. A shock absorber according to claim 6, wherein said adjusting means comprises a cap screwed into the outer end portion of said inner cylinder member to receive said tension-adjusting spring.

8. A shock absorber according to claim 6, wherein said prohibiting means comprises a nonreturn valve.

9. A shock absorber according to claim 6, wherein said prohibiting means comprises a sufficiently narrow passage to effectively prevent fluid flow therethrough in response to transient pressures.

10. A shock absorber according to claim 6, wherein the effective strength of the shock-absorbing spring within said second cylinder chamber is selected larger than that of the tension-adjusting spring within said inner cylinder member.